United States Patent [19]

White et al.

[11] Patent Number: 5,410,713

[45] Date of Patent: Apr. 25, 1995

[54] POWER-MANAGEMENT SYSTEM FOR A COMPUTER

[75] Inventors: Dave White; Yen W. Lee; Rod Ang, all of San Jose, Calif.; Ray Barbieri, Campbell, Calif.; James Chen, Taipei, Taiwan, Prov. of China; Suh C. Lee, Palo Alto, Calif.

[73] Assignee: Smith Corona/Acer, New Canaan, Conn.

[21] Appl. No.: 816,108

[22] Filed: Jan. 2, 1992

[51] Int. Cl.6 .......................... G06F 11/30; H02J 9/00
[52] U.S. Cl. .................................... 395/750; 395/575; 395/725; 364/707; 307/66; 365/226; 365/229
[58] Field of Search .................... 395/750, 575, 725; 365/226, 229; 364/707; 307/66

[56] References Cited

U.S. PATENT DOCUMENTS

| 4,189,717 | 2/1980 | Takeuchi | 364/707 |
| 4,200,916 | 4/1980 | Seipp | 364/900 |
| 4,232,377 | 11/1980 | Tallman | 365/229 |
| 4,495,569 | 1/1985 | Higawa | 395/725 |
| 4,551,841 | 11/1985 | Fujita et al. | 395/750 |
| 4,553,223 | 11/1985 | Bouhelier et al. | 395/750 |
| 4,611,289 | 9/1986 | Coppola | 395/750 |
| 4,654,821 | 3/1987 | Lapp | 395/750 |
| 4,675,538 | 6/1987 | Epstein | 307/66 |
| 4,777,626 | 10/1988 | Matsushita et al. | 365/229 |
| 4,809,163 | 2/1989 | Hirasawa et al. | 395/750 |
| 4,922,450 | 5/1990 | Rose et al. | 395/750 |
| 5,121,500 | 6/1992 | Arlington et al. | 395/750 |
| 5,163,153 | 11/1992 | Cole et al. | 395/750 |
| 5,167,024 | 11/1992 | Smith et al. | 395/750 |
| 5,182,810 | 1/1993 | Bartling et al. | 395/750 |
| 5,220,671 | 6/1993 | Yamagishi | 395/750 |
| 5,230,074 | 7/1993 | Canova et al. | 395/750 |
| 5,237,692 | 8/1993 | Raasch et al. | 395/750 |

Primary Examiner—Allen R. MacDonald
Assistant Examiner—George Davis
Attorney, Agent, or Firm—Townsend and Townsend Khourie and Crew

[57] ABSTRACT

A power management system for a personal computer comprises a power management processor, a switchable power supply and a keep alive power supply. The processor is powered by the keep alive power supply that continuously provides power. The computer is powered by a power supply that is switchable in response to a control signal. The processor preferably controls the switchable power supply. The processor is coupled to receive external device interrupts from a plurality of external devices that instruct the processor when to turn the switchable power supply on and off. The processor is also coupled to the computer through an interface. The power management system also includes a method for turning the computer on and off. A preferred method uses the processor to control the power provided to the computer. The preferred method also uses the processor to dictate whether the computer will to perform a long boot that brings the computer to an operational state, identifies the computer's configuration, and tests memory, or a short boot that brings the computer to an operational state in a much shorter time. A preferred method for turning the computer off includes the ability to exit a program being run by the computer, and saving a hardware state of the computer on a hard disk.

10 Claims, 5 Drawing Sheets

POWER-MANAGEMENT SYSTEM FOR A COMPUTER

BACKGROUND OF THE INVENTION

1. Field of the Invention

The present invention relates to power supply systems. In particular, the present invention relates to a power management system for personal computers that provides power to the computer system in response to interrupts from external devices.

2. Description of Related Art

Conventional present day computer systems include a power supply that provides the power required to operate the computer system. The power supply is coupled to an AC voltage source and converts the AC voltage to a DC voltage. Typically, the power supply is coupled through a switch that is manually activated by the user and only provides power when the switch is closed. Since the switch is manual, it cannot be electronically activated to open and close to turn the computer off and on, respectively. Thus, the prior art does not provide a method for using external device interrupts or other electronic signals to control the application of power to the computer.

The prior art has attempted to reduce this shortcoming by keeping computers in the on or operational state continuously. However, such a practice wastes significant amounts of power. This practice also reduces the life of the electronic components that comprise computers. Additionally, with the advent of portable computers that have a very limited power supply, such continuous operation is not possible.

Therefore, there is a need for a system for providing power to a computer system in response to external events.

Another problem associated with power management systems of the prior art is the requirement of manually exiting all applications or programs being run on the computer before turning off the power. With most all personal computers, the user must exit the program before turning the power off, otherwise, the data used by the program will be destroyed or corrupted. Additionally, turning off the power without exiting the program even affects the operation of some programs. Thus, there is a need for a system that saves the state of the hardware and memory before turning off the power.

SUMMARY OF THE INVENTION

The present invention overcomes the deficiencies of the prior art by providing a power management system that allows power to be controlled by external devices. A preferred embodiment of the power management system of the present invention comprises a power management processor, a switchable power supply and a keep alive power supply. The processor is coupled to and powered by the keep alive power supply. The keep alive power supply provides a voltage as long as it is coupled to a source. The computer is coupled to and powered by the switchable power supply. The switchable power supply can be switched on and off in response to a control signal.

In the preferred embodiment, the processor is coupled to the switchable power supply and provides the control signal that turns the switchable power supply on and off. The processor is also coupled to receive external device interrupts from a plurality of external devices. The external device interrupts are used to instruct the processor when to turn the switchable power supply on and off. One such device providing an interrupt may be an ordinary switch that is conventionally used to turn computers on and off. The processor is also coupled to the computer through an interface and preferably can issue non-maskable interrupts (NMI) to the central processing unit (CPU) of the computer.

The power management system of the present invention also includes a method for turning the computer on and off. The preferred method for providing power to the computer comprises the steps of: continuously providing power to the power management processor with a first power supply; monitoring external device interrupt lines coupled to the power management processor; providing power to the computer if an external device interrupt is received by sending a control signal to a second power supply coupled to power the computer; and sending a boot status command from the power management processor to the computer. The boot status command can be either a long boot command that brings the computer to an operational state, identifies the computer's configuration, and tests memory, or a short boot command that brings the computer to an operational state in a much shorter time. The preferred method for turning the computer off comprises the steps of providing power to the power management processor with a first power source; monitoring external device interrupt lines coupled to the power management processor; signaling the computer when an external device interrupt is received; performing an operation that exits running programs and saves the hardware states of the computer on the hard disk; sending tasks from the computer to the power management processor; switching off a second power source coupled to the computer; and performing the tasks received in the sending step with the power management processor.

DETAILED DESCRIPTION OF THE PREFERRED EMBODIMENTS

Figure 1:
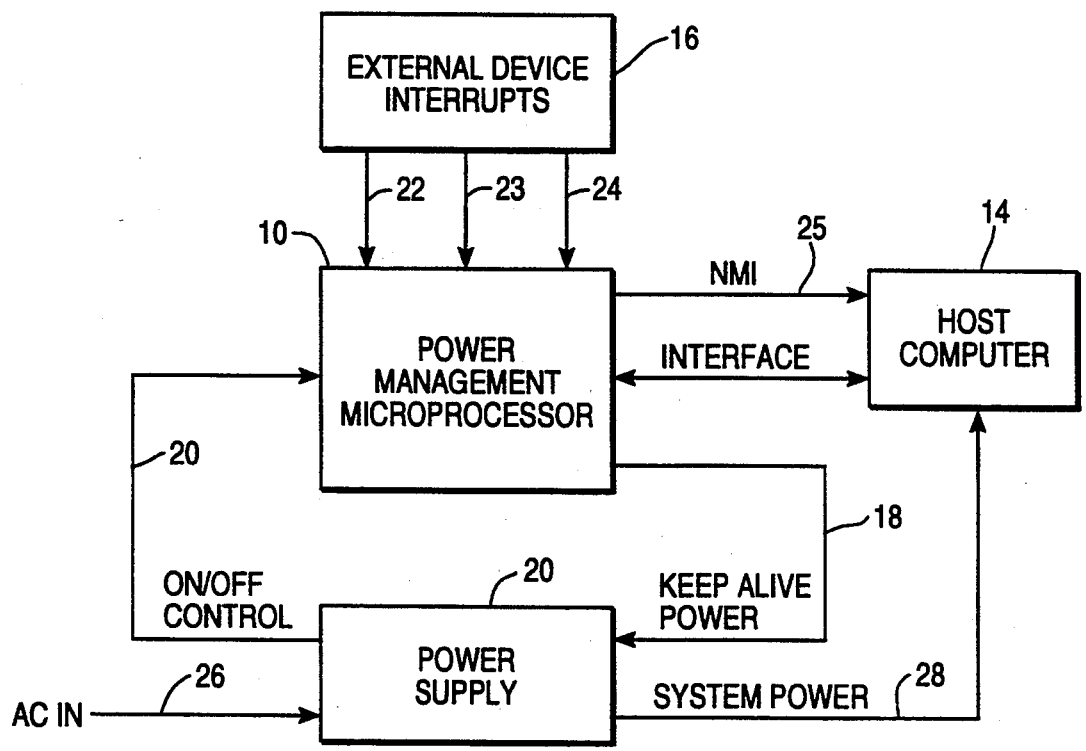
FIG. 1 is a block diagram of a preferred embodiment of a power management system of the present invention.

Referring now to FIG. 1, a preferred embodiment of a power management system constructed in accordance with the present invention is shown. The power management system preferably comprises a power management processor (PMM) 10 and a power supply 12. The PMM 10 electronically controls the power supplied to a host computer system 14. The power supply 12 provides power to both the PMM 10 and the computer 14. The power supply 12 receives an AC input on line 26. Line 28 couples the power supply 12 to the computer 14 to provide the system power. The output of the power supply 12 on line 28 is controlled by an on/off control signal sent from the PMM 10 to the power supply 12 on line 18. The power supply 12 also provides continuous power to the PMM 10 on line 20.

Figure 2:
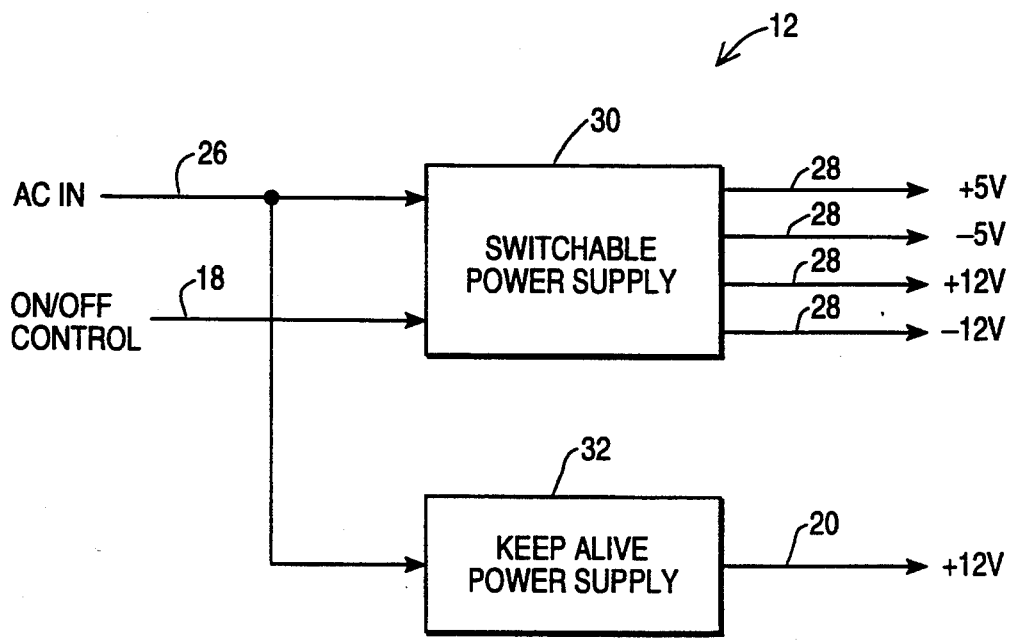
FIG. 2 is a block diagram of a preferred embodiment for the power supply of the present invention.

Referring now to FIG. 2, a preferred embodiment of the power supply 12 is shown. The power supply 12 preferably comprises a switchable power supply 30 and a keep alive power supply 32. Both power supplies 30, 32 are preferably coupled to receive an AC power input on line 26. The keep alive power supply 32 is preferably a low wattage power supply that provides a 12 volt output in an exemplary embodiment. The keep alive power supply 32 continuously outputs power while an AC input is provided. In contrast, the switchable power supply 30 is electronically controllable, and may be selectively turned on an off using an enable (on/off control) signal on line 18. The switchable power supply 30 provides voltages of +5, −5, +12 and −12 at its outputs in an exemplary embodiment. For example, power supply by a custom made power supply manufactured by Hi-Power.

Referring back to FIG. 1, the coupling of the PMM 10 for receiving external device interrupts 16 on lines 22–24 is shown. The PMM 10 is preferably coupled to all hardware devices/interfaces (not shown) that can cause the computer 14 to wake up (i.e., switch power supply 30 to the on state). The external device interrupts 16 signal when the PMM 10 should apply or remove power from the computer 14. The external device interrupts 16 may be from a variety of devices that the user has granted permission to switch the computer on and off. It should be understood that all interfaces that can generate "WAKE UP" interrupts to the PMM 10 must be powered by the keep alive power supply 32. In the preferred embodiment, external device interrupts 16 are provided by a conventional manual switch for switching power on or off. In the preferred embodiment, an external device interrupt is also provided for a ring detect from a tip and ring interface (not shown) used with modems, facsimile machines and telephone answering machines. While the present invention will be discussed primarily with reference to these two types of external device interrupts, it should be understood to those skilled in the art that the PMM 10 could receive interrupts from a various external devices that need to turn the computer 14 on and off.

The PMM 10 is also coupled to the computer 14. The PMM 10 preferably sends a non-maskable interrupt (NMI) on line 25 to the computer 14 (i.e., the main Intel architecture based processor) and is also coupled to the computer 14 for sending status and command signals. The PMM 10 preferably maintains the communications protocol with the system BIOS (Basic Input Output System) of the computer 14. The PMM 10 sends the computer 14 status signals such as the short boot which indicates that the computer 14 is to be powered up to an operational state, and the long boot signal that indicates the computer 14 is to be powered up and also the configuration of the computer 14 and memory are to be tested. The PMM 10 also receives data from the computer 14. Once the computer 14 has been informed that the power will be removed, the computer 14 sends instructions to the PMM 10 indicating the functions that the PMM 10 is to perform when the computer 14 is in the sleep state (Power from switchable power supply 30 is off while power is provided to the PMM 10).

The PMM 10 is preferably a microprocessor such as the Intel 8051. However, it should be understood that the PMM 10 can be based on any instruction set. The instruction set is not material to the invention. As briefly noted above, the PMM 10 controls the switchable power supply 30. In particular, the PMM 10 switches the power supply 30 on and off in response to external device interrupts 16 on lines 22–24. The PMM 10 preferably includes or is coupled to memory (not shown) for storing the tasks to be performed and other status information used in the operations just described. For example the PMM 10 preferably includes Random Access Memory (RAM) and Read Only Memory (ROM) to maintain communications protocol with the system BIOS of the computer 14. The PMM 10 also includes a device for keeping real time. The real time is then compared to alarm times for powering down or up the computer 14.

The power management system of the present invention also includes methods for operating the system described above. The methods use three levels of instructions or software. First, the PMM power management code details the operations performed by the PMM 10 such as sending the on/off control signal, keeping real time, and comparing real time to the alarm settings. Second, the system BIOS power management code, which is preferably incorporated into the conventional system BIOS of computer 14, provides to a protocol that distinguishes "long boot" commands from "short boot" commands sent by the PMM 10. Third, the management system of the present invention includes an application level program interface definition (API) that operating systems, such as Microsoft Windows 3.0, and high based applications to invoke the services of the power management system.

Figure 3:
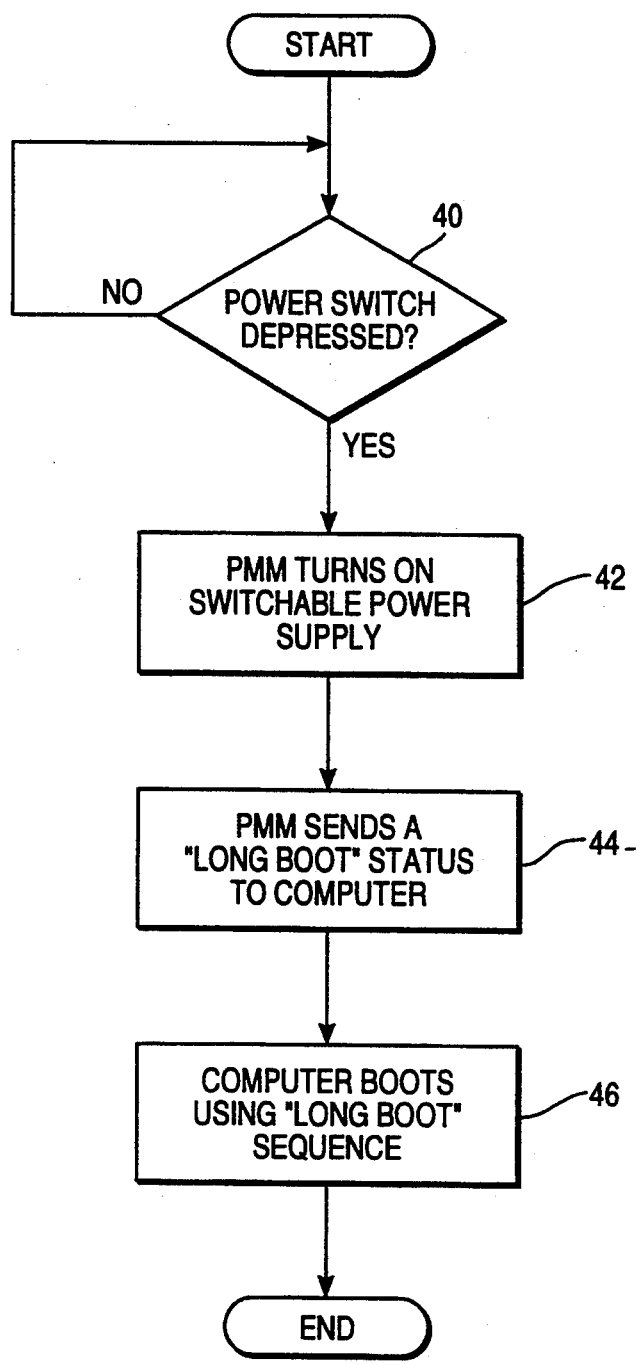
FIG. 3 is a flow chart for the preferred method for providing power with the system of the present invention.

Referring now to FIGS. 3–6, the preferred methods for performing the power on sequence, the power off sequence, the wake up sequence and the sleep sequence will be described. The power on sequence is shown in FIG. 3. When the computer 14 is in the off or sleep state, the preferred embodiment of the PMM 10 monitors the state of the Power ON/OFF switch in step 40, keeps real time and compares the real time to the alarm settings. The power on sequence is performed in response to an external interrupt indicating the switch (not shown) has been closed. Once a closed switch is detected, the PMM 10 turns on the main system power to the computer in step 42 by sending the on/off control signal to enable the switchable power supply 30. Then in step 44, the PMM 10 sends a power cycle status indication specifying a long boot command to the system BIOS of the computer 14 to boot to an operational state, identify the computer's system configuration and perform all memory tests. Once the computer 14 has been powered up, the API interacts with commercially available software to restore the computer 14 to the state and application the computer 14 was in prior to being powered down.

Figure 4:
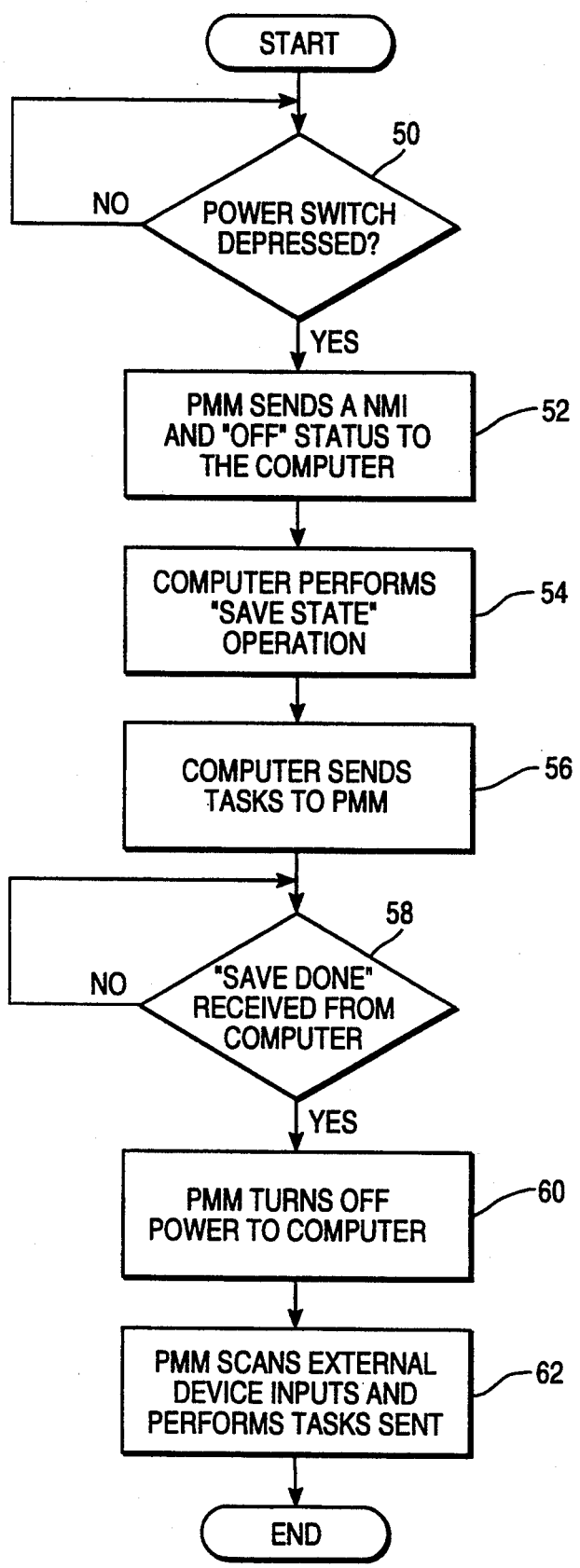
FIG. 4 is a flow chart for the preferred method for turning off power with the system of the present invention.

Referring now to FIG. 4, the power off sequence will be described. When the computer 14 is in the ON (active) state, the PMM 10 monitors the state of the power ON/OFF switch in step 50 for an external interrupt indicating that the switch is open. If a change of state in the power ON/OFF switch is detected, an external device interrupt is sent to the PMM 10 and the power off sequence is initiated. In step 52, the PMM 10 issues a NMI to the host computer 14. Upon receipt of the NMI in step 54, the host computer 14 initiates a "Save State" operation at the end of which the state of the hardware, as well as the state of the memory is saved to the a non-volatile storage media such as a hard disk. This particularly advantageous because it lets the computer 14 save the state of hardware and memory before the on/off control signal is sent to turn off power supply 30. These states stored in memory can later be used to re-boot the computer 14 in the exactly the same state it was in prior to power down. After completion of the Save State operation, the computer 14 assigns tasks to be performed by the PMM 10 during the SLEEP state of the computer 14 and then issues a Save Done status to the PMM in step 56. In step 58, the PMM 10 monitors the status line for the Save Done signal from the computer 14. Once the Save State operation is complete, the PMM 10 turns OFF the main system power by disabling the switchable power supply 30.

The present invention is particular advantageous because it provides wake up and sleep sequences that allow application software, such as WINFAX, to be activated and used even though the computer 14 was in the SLEEP (OFF) state at the time the telephone ring was first detected. More specifically, the present invention allows the computer 14 to detect a ring while the computer 14 is in the SLEEP (OFF) State; boot computer 14; activate the WINFAX software in less than 4 rings on the telephone line; receive the FAX from the FAX modem using WINFAX; store the FAX on the disk using WINFAX; and return the computer 14 to the SLEEP (OFF) state. The present invention will now be described with reference to the WINFAX application software and FAX applications, however, it should be understood by those skilled in the art that the present invention may be used with various other software applications that may be initiated by external device interrupts.

Figure 5:
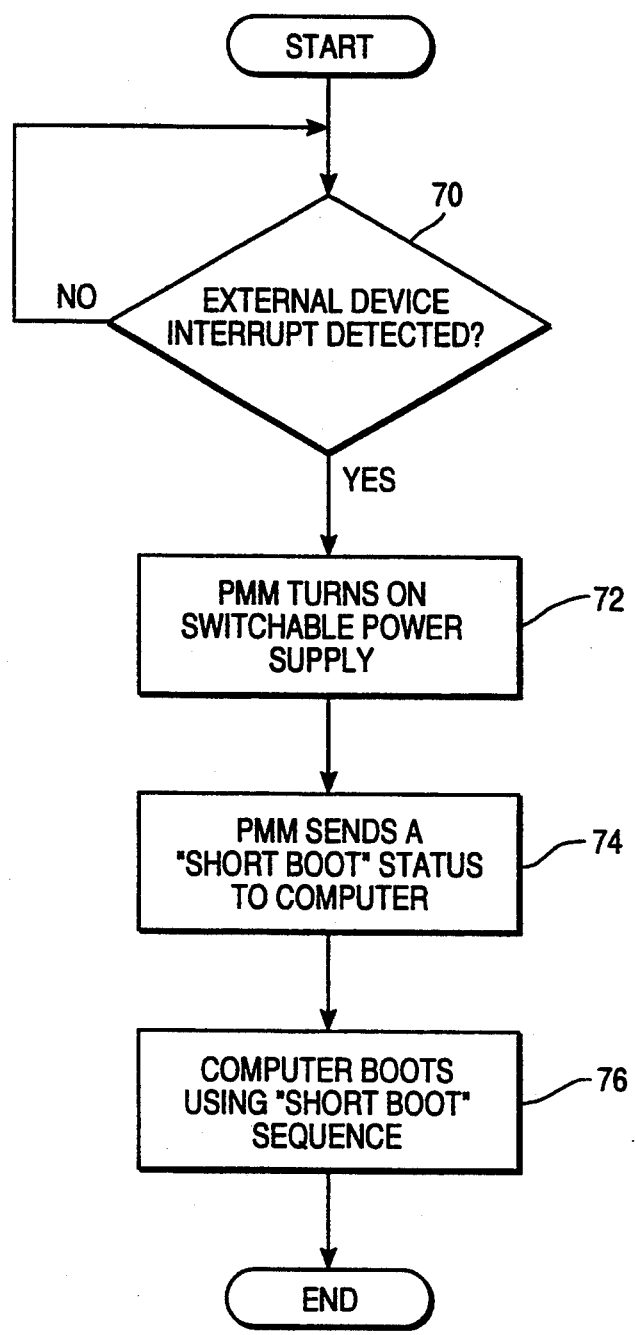
FIG. 5 is a flow chart of a wake up sequence for providing power with the system of the present invention.

Referring now to FIG. 5, the wake up sequence is shown. The power management system of the present invention executes the wake up sequence when either (1) an external hardware event occurs, such as a ring is detected on the Tip & Ring Interface, or (2) an alarm event occurs when the real time kept by PMM 10 matches with the alarm time programmed by the computer 14. When the computer 14 is in the SLEEP state, the PMM 10 also monitors external device interrupts 16 from the Ring Detect on the Tip & Ring Interface, and keeps real time and compares the current time against programmed alarm settings (Step 70). If a ring is detected, the PMM 10 switches power supply 30 on in step 72. Next, in step 74, the PMM 10 sends a short boot status signal to the computer 14. The short boot status signal indicates that the system BIOS is not to perform all the power-on diagnostics, hardware initialization, and memory tests, but in the interest of time, to directly restore the state of the computer 14 from an alternate bootable partition on the hard disk drive. This alternate (active) partition contains the applications needed to run the required functions of the system. The short boot process allow the present invention to boot, load the FAX software and be ready to receive the fax within four rings on the Tip & Ring interface. Finally in step 76, the computer boots using the short boot command.

Figure 6:
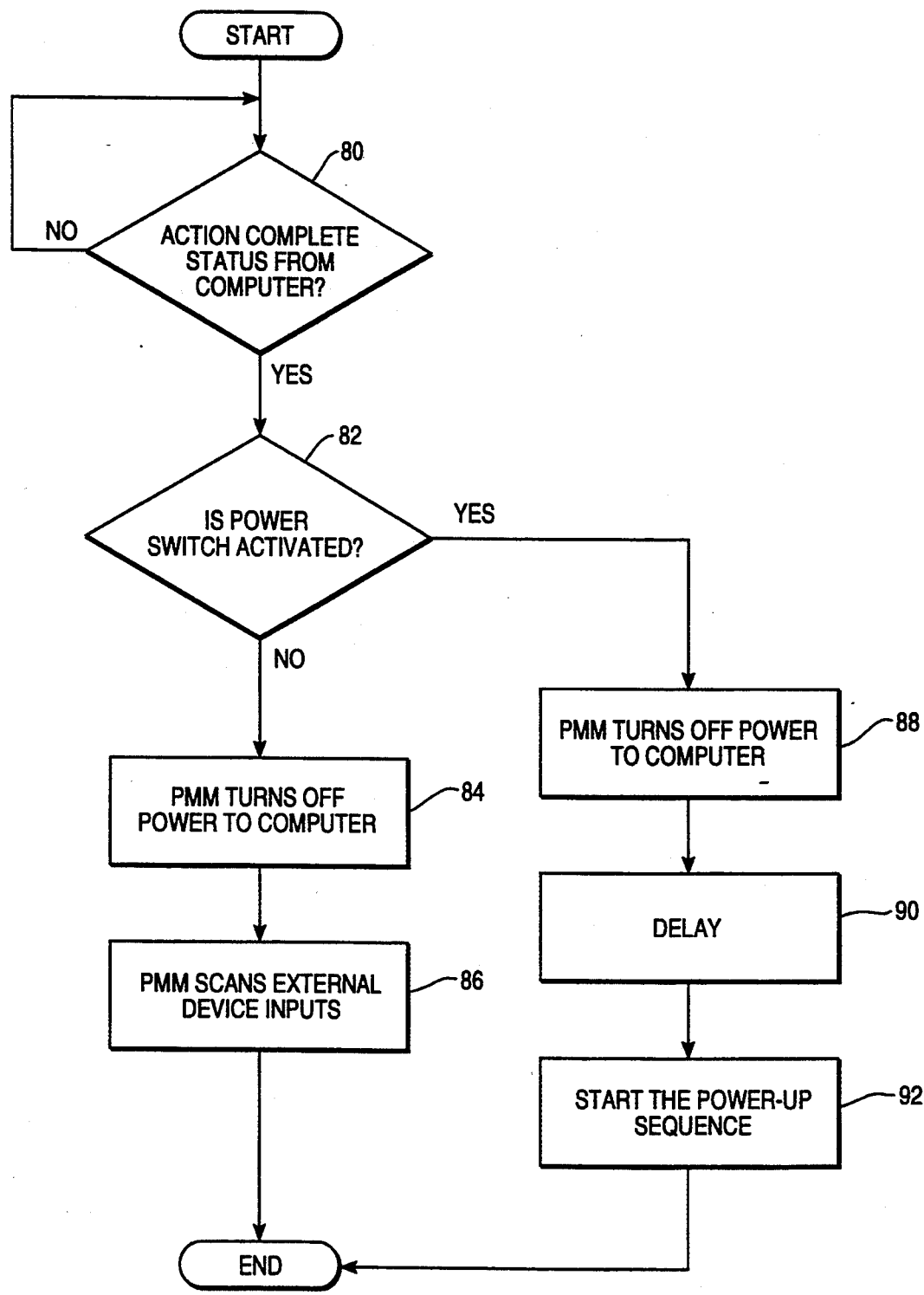
FIG. 6 is a flow chart of a sleep sequence for turning off power with the system of the present invention.

Referring now to FIG. 6, the preferred method for returning the computer 14 to the SLEEP state is shown. Once the computer 14 is booted with the short boot command an is awake (on), the PMM 10 performs monitors the state of the Power ON/OFF switch and waits for "ACTION COMPLETE" status from the host computer 14 in step 80. Upon receipt of the "ACTION COMPLETE" status, the present invention tests whether the state of the Power ON/OFF switch changed in step 82. If the state of the Power ON/OFF switch has not changed, the PMM 10 turns off the main system power supply in step 84 and reverts back to the tasks normally performed during the SLEEP state in step 86. On the other hand, if the Power ON/OFF switch state had changed in step 82, then the PMM 10 turns off power supply 30 in step 88. In step 90, the preferred method provides a delay, and then the normal power on sequence described with reference to FIG. 3 is executed in step 92.

Having described the present invention with reference to specific embodiments, the above description is intended to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the present invention.

What is claimed is:

1. A system for supplying power to a computer in response to interrupts from external devices, said system comprising:
   a first power supply having an input and an output for converting an AC voltage to a DC voltage, the input coupled to a first AC voltage source to receive AC voltage;
   a second power supply having a voltage input, a control input and an output for converting an AC voltage to a DC voltage in response to a control signal, said input coupled to said AC voltage source to receive AC voltage in parallel with said first power supply, said output coupled to supply power to the computer; and
   a power management processor having a power input, the power input of the power management processor connected to the output of the first power supply wherein said power management processor is powered by said first power supply, an output of the power management processor connected to the control input of the second power supply wherein the output of the power management processor provides control signals to said second power supply, control inputs and outputs coupled to the computer, and interrupt inputs coupled to the external devices to receive interrupts from the external devices.

2. The system of claim 1 wherein the power management processor is a microprocessor.

3. The system of claim 1 wherein one of the external devices is a switch and wherein the second power supply supplies power when the switch is closed.

4. The system of claim 1 wherein the processor outputs long boot and short boot commands to the computer and is capable of sending an interrupt to the computer, and the computer performs different power up functions as directed by the boot command received from the power management processor.

5. The system of claim 1 wherein the power management processor includes a device for keeping time, and logic for outputting the control signal to the second power supply when the time reaches predetermined values.

6. The system of claim 1 wherein the power management processor comprises memory for storing tasks to be performed by the power management processor.

7. A method for controlling with a power management processor the power supplied to a computer, wherein said computer can perform any of a plurality of boot processes, said method comprising the steps of:

continuously supplying power to the power management processor;

monitoring external device interrupt lines coupled to the power management processor;

if an external device interrupt is received in the power management processor, supplying power to the computer by sending a control signal from the power management processor to a switchable power supply, the switchable power supply being coupled to the computer for supplying power thereto; and sending a boot status command from the power management processor to the computer to identify which boot process of said plurality of boot processes the computer is to perform.

8. The method of claim 7, wherein said computer has at least one identifiable configuration, and wherein said computer includes testable memory and wherein the step of sending may send one of:

a long boot command that brings the computer to an operational state, identifies the computer's configuration, and tests memory; and a short boot command that brings the computer to an operational state.

9. The method for turning off the power provided to a computer from a first power source with a power management processor having a second power source, the computer being capable of performing a plurality of operations, including a save state operation said method comprising the steps of:

supplying power to the power management processor with the second power source;

monitoring external device interrupt lines coupled to the power management processor;

sending a signal from said power management processor to the computer when an external device interrupt is received by said power management processor;

performing said save state operation with the computer in response to said step of sending a signal;

sending tasks from the computer to the power management processor;

switching off the first power source by the power management processor; and performing the tasks using the power management processor.

10. The method of claim 9, wherein the step of performing the save state operation includes performing while the computer is running a program, the steps of:

exiting, by the computer, the program that the computer is running;

storing, by the computer a first state of a computer, hardware to a non-volatile media; and storing, by the computer, a second state of a memory to a non-volatile media.

* * * * *